3,248,412
THIOPHOSPHONIC ACID ESTERS

Gerhard Schrader, Wuppertal-Cronenberg, Germany, assignor to Farbenfabriken Bayer Aktiengesellschaft, Leverkusen, Germany, a corporation of Germany
No Drawing. Filed Feb. 9, 1960, Ser. No. 7,536
Claims priority, application Germany, Feb. 16, 1959, F 27,714
10 Claims. (Cl. 260—455)

The present invention relates to and has as its objects new and useful insecticidal thiophosphoric acid esters as well as methods for preparing the same. Generally the compounds of the present invention may be represented by the following formula

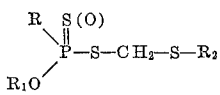

in which R stands for any aliphatic or aromatic residue, $R_1$ is preferably a lower alkyl radical up to 4 carbon atoms, and $R_2$ is a heterocyclic or acyl radical.

Compounds of this type, i.e. dithiophosphonic acid alkyl esters in which the alkyl group attached to the thiolosulfur contains a substituted mercapto radical, partially are already known from the literature. Their insecticidal properties are also known. According to this invention a new class of especially substituted dithiophosphonic acid esters has been found to exhibit outstanding insecticidal and partially miticidal properties. More particularly the compounds of this invention are those of the above said formula

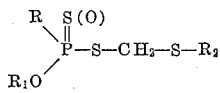

in which R and $R_1$ have the same significance as given above, and in which the acyl radical $R_2$ is the residue of a carbonic acid, thiocarbonic acid, carbamic acid, thiocarbamic acid, phosphoric acid, thiophosphoric acid, phosphonic acid, thiophonic acid, phosphonic acid, thiophosphonic acid, as well as amid derivatives of the latter compounds of the phosphorus series. If $R_1$ is a heterocyclic group this radical preferably belong to the thiazol, thio-diazol, imidazol, pyrazol, or triazol series or their benzene-annelled derivatives.

The inventive compounds may be prepared by methods known in principle, thus corresponding (thiono)phosphonic acid halides may be reacted with appropriate substituted mercaptans as it is to be seen from the following equation:

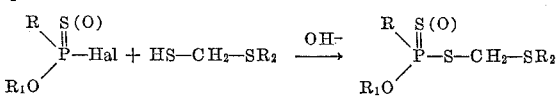

In the above formulae the symbols have the same significance as given above.

Another method to prepare the inventive compounds consists in reacting (di)thiophosphonic acids (or their salts) with appropriate substituted mercapto methyl halides as it is to be seen from the following equation:

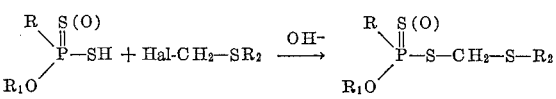

Also in these formulae the symbols have again the same significance as given above.

A preferred method to prepare the inventive compounds consists in reacting the readily obtainable alkyl or aryl thiono-O-alkylester thiolphosphonic acid alkali metal salts with chloro-bromo-methane. In this manner, compounds result having the general formula

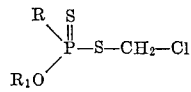

in which R and $R_1$ have again the significance given above.

These α-chloro-methyl-thiono-thiolphosphonic-O-alkyl esters may be reacted with suitable compounds containing sulfhydryl groups and, in this way, the new phosphonic acid esters of this invention are obtained which possess good insecticidal properties.

As compounds containing sulfhydryl groups there may be considered for example: thiocarboxylic acids, dithiocarbamic acids, thiocyanic acid, xanthogenates, thiol-acids of the phosphoric, phosphonic and phosphinic series (or derivatives, e.g. amines thereof), and heterocyclic mercaptans as well as further similarly constructed or reacting compounds.

For this purpose, especially the alkali metal salts of the aforesaid compounds containing sulfhydryl groups are reacted with the α-chloromethyl thiono-thiolphosphonic acid esters.

The new phosphonic acid esters are outstanding plant protective agents or pesticidal agents which are used in a conventional manner, i.e. preferably in combination with suitable solid or liquid extending or diluting agents optionally with the concurrent use of emulsifiers to improve the dispersibility of the active compounds in water.

As an example for the special utility of the inventive compounds the esters of the following formulae (I) 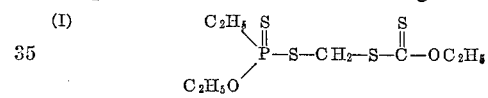

(II) 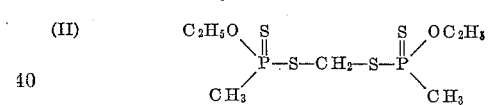

have been tested against aphids and spider mites. Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This pre-mixture is diluted with water to the desired concentration.

The tests have been carried out as follows:

(a) against aphids (species *Doralis fabae*). Heavily infested bean plants (*Vitia faba*) have been sprayed drip wet with solutions in a concentration as shown below and prepared as shown above. The effect has been determined after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| (I) | 0.001 | 100 |
| (II) | 0.0001 | 100 |

(b) against spider mites (species *Tetranychus telarius* Hanst.). The tests have been performed on *Phaseolus vulgaris*. The plants have been sprayed drip wet with solutions as prepared above in a concentration as shown below. Evaluation has been carried out after 24 hours, 48 hours and 8 days. The spider mites were killed as shown in the table below:

| Compound | Aqueous concentration (in percent active ingredient/ water) | Killing rate (in percent) |
| --- | --- | --- |
| (I) | 0.001 | 100 |
| (II) | 0.0001 | 100 |

The following examples are given for the purpose of illustrating the process.

EXAMPLE 1

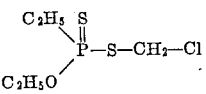

208 grams (1 mol) of ethyl-thiono-O-ethyl esterthiolphosphonic acid potassium salt are dissolved in 400 ml. of acetonitrile. 260 grams of chlorobromo-methane are added with stirring at 30–40° C. Stirring is continued for 3 hours at 40° C. and the reaction product is then taken up in 500 ml. of chloroform. The chloroform solution is washed several times with water and subsequently dried with sodium sulfate. By fractionation 160 grams of ethyl thiono-O-ethyl-S-α-chloro-methyl-phosphonic acid ester of B.P. 60° C./0.01 mm. Hg are obtained. Yield: 73% of the theoretical.

0.001% solutions kill flies to 100%. Aphids are killed completely with solutions of 0.01%. Ticks are killed completely with 0.025% solutions. 0.001% solutions kill blowflies to 50%.

EXAMPLE 2

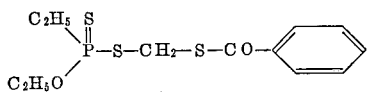

36 grams of thiobenzoic acid potassium salt are dissolved in 250 ml. of acetonitrile. 44 grams (2/10 mol) of ethyl - thiono - O - ethyl - S - α - chloromethyl phosphonic acid ester are added with stirring at 60° C. The mixture is maintained at 60° C. for 2 hours, and the reaction product is then diluted with 300 ml. of benzene. The benzene solution is washed twice with 250 ml. of water. After drying of the benzene solution it is fractionated. In this way, 50 grams of the new ester of B.P. 142° C./0.01 mm. Hg are obtained. Yield: 89% of the theoretical.

Aphids are killed completely with 0.01% solutions. 0.001% solutions kill spider mites to 100%.

By the same way but using instead of the thiobenzoic acid potassium salt the corresponding equimolecular amount of thioacetic acid potassium salt and instead of the ethyl - thiono - O - ethyl-S-α-chloromethyl phosphonic acid ester the exact equimolecular amount of the corresponding phenyl-thiono-O-ethyl-S-α-chloromethyl-phosphonic acid ester there is obtained the following compound:

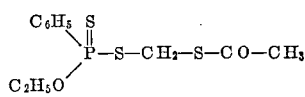

EXAMPLE 3

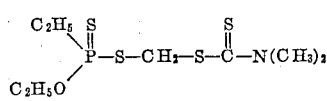

48 grams of dimethyl-dithiocarbamic acid sodium salt are dissolved in 200 ml. of acetonitrile. 66 grams (3/10 mol) of ethyl-thiono-O-ethyl-S-α-chloromethyl-phosphoic acid ester are added with stirring at 60° C. Heating is continued to 65° C. for an hour and the reaction product placed in 500 ml. of water. The separated oil is taken up in 300 ml. benzene and washed several times with water. The benzene solution is dried. The solvent is subsequently distilled off in a vacuum. In this way 82 grams of a viscous water-insoluble yellow oil are obtained. Yield 95% of the theoretical. Calculated for mol 303: N, 4.6%; S, 42.3%; P, 10.2%. Found: N, 4.3%; S, 42.0%; P, 10.5%.

On rats per os the new compounds show a toxicity of 10 mg./kg. $LD_{50}$. Spider mites are killed completely with 0.0001% solutions. 0.001% solutions kill aphids to 100%. Cockroaches are killed completely with 0.1% solutions.

By using instead of the sodium salt of dimethyl-dithiocarbamic acid the corresponding equimolecular amount of the sodium salt of diethyl-thiocarbamic acid and instead of the ethyl-thiono-O-ethyl-S-α-chloromethyl-phosphonic acid ester the corresponding equimolecular amount of a vinyl-thiono-O-ethyl-S-α-chloromethyl-phosphonic acid ester there is obtained the following compound:

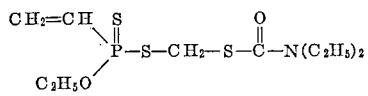

EXAMPLE 4

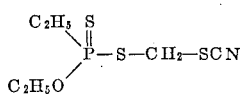

30 grams of potassium thiocyanate are dissolved in 100 ml. of 90% alcohol. 66 grams (3/10 mol) of ethyl-thiono-O-ethyl-S-α-chloromethyl phosphonic acid ester are added thereto at 35–40° C. with stirring. Heating is continued to 85° C. for 5 hours and the reaction product then taken up in 300 ml. of benzene. The potassium chloride formed is filtered off. The filtrate is washed several times with water and subsequently dried with sodium sulfate. By fractionation, 50 grams of the new ester of B.P. 105° C./0.01 mm. Hg are obtained.

On rats per os the ester shows a toxicity of 25 mg./kg. $LD_{50}$. Flies and spider mites are killed completely with 0.01% solutions. Larvae are killed completely with 0.0001% solutions. 0.01% solutions kill bolwflies to 50%.

EXAMPLE 5

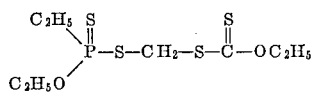

25 grams of potassium xanthogenate are dissolved in 125 ml. of 95% alcohol. 32 grams (3/10 mol) of ethyl thiono-O-ethyl-S-α-chloromethyl-phosphonic acid ester are added with stirring at 50° C. The temperature is maintained at 80° C. for an hour; the reaction product is then diluted with 300 ml. of benzene and the separated potassium chloride is filtered off. The benzene solution is washed several times with water and subsequently dried with sodium sulfate. By fractionation 30 grams of the new ester of B.P. 125° C./0.01 mm. Hg are obtained. Yield 81% of the theoretical.

Aphids and spider mites are killed completely with 0.001% solutions. Larvae are killed to 100% with 0.00001% solutions. 0.01% solutions kill blowflies to 50%.

EXAMPLE 6

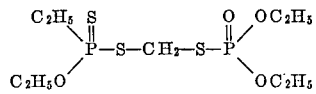

60 grams of O.O-diethyl-thiolphosphoric acid ammonium salt are dissolved in 110 ml. of methyl ethyl ketone. 66 grams of ethyl-thiono-O-ethyl-S-α-chloromethylphosphonic acid ester (3/10 mol) are added with stirring at 70° C. and heated for a further 2 hours to 75–80° C. The reaction product is then diluted with 200 ml. of benzene and washed twice each time with 100 ml. of water. After drying with sodium sulfate the solvent is well removed in vacuum. In this way 40 grams of the new ester as a weakly yellow water-insoluble oil are obtained. Yield: 37% of the theoretical. Calculated for mol 352: S, 27.3%; P, 17.6%. Found: S, 26.8%; P, 17.5%.

On rats per os the new ester shows a toxicity of 5 mg./kg. LD$_{50}$. 0.001% solutions kill spider mites to 100%. Aphids are killed completely with 0.01% solutions. Ticks are killed to 100% with 0.005% solutions.

If instead of the ammonium salt of O.O-diethyl-thiolphosphoric acid there are used the corresponding equimolecular amounts of the ammonium salt of O.O-diethyl-dithiophosphoric acid or of O-ethyl-thiolphosphoric acid dimethyl amide or of O-ethyl-phenyl-thiolphosphoric acid or of dimethyl-dithiophosphinic acid there are obtained the following compounds:

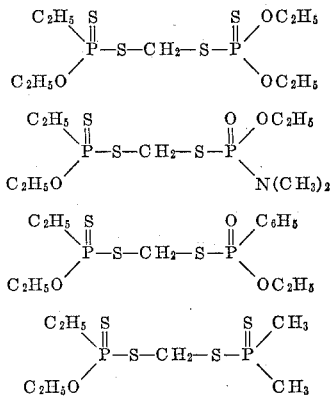

EXAMPLE 7

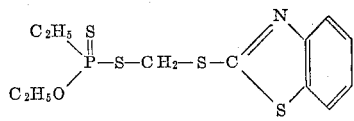

52 grams of 2-mercapto-benzothiazole are dissolved in 200 ml. of anhydrous alcohol. A sodium methylate solution is added to the solution containing 3/10 mol of dissolved sodium. 66 grams (3/10 mol) of ethyl-thiono-O-ethyl-S-α-chloromethylphosphinic acid ester are then added at 60° C. followed by heating to 60–70° C. for 5 hours. The reaction product is taken up in 300 ml. of benzene and washed several times with water. After the usual working up 85 grams of the new ester are obtained as a viscous yellow water-insoluble oil. Yield: 81% of the theoretical. Calculated for mol 349: N, 4.0%; S, 36.7%; P, 8.9%. Found: N, 3.8%; S, 36.6%; P, 8.4%.

On rats per os the new ester shows a toxicity of 50 mg./kg. LD$_{50}$. Aphids are killed completely with 0.01% solutions and spider mites are killed to 100% with 0.001% solutions.

By the same way but using instead of the 2-mercaptobenzothiazole the corresponding equimolecular amount of 2-mercapto-benzoxazole there is obtained the following compound:

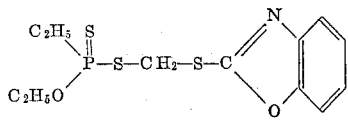

EXAMPLE 8

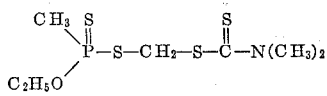

32 grams of dimethylamino-thiocarbamic acid sodium salt are dissolved in 200 ml. acetonitrile. 42 grams (2/10 mol) of methyl-thiono-O-ethyl-S-α-chloromethyl phosphonic acid ester (B.P. 50° C./0.01 mm. Hg) are added at 60° C. with stirring. Stirring is continued at 65° C. for an hour and the reaction product placed in 500 ml. of water. The separated oil is taken up in benzene, separated from the water and dried with sodium sulfate. After distillation of the solvent 42 grams of the new ester are obtained as a viscous yellow water-insoluble oil. Yield: 72% of the theoretical.

Spider mites are killed completely with 0.001% solutions. Aphids are killed completely with 0.01% solutions.

EXAMPLE 9

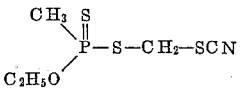

20 grams of ammonium thiocyanate are dissolved in 150 ml. of acetonitrile. 42 grams (2/10 mol) of methylthiono-O-ethyl-S-α-chloromethyl phosphonic acid ester are added at 60° C. with stirring. Heating is continued at 75° C. for an hour and the reaction product taken up in 300 ml. of benzene. The solution is washed with water. After separating and drying the benzene solution is fractionated. 22 grams of the new ester of B.P. 100° C./0.01 mm. Hg are obtained. Yield: 48% of the theoretical. The ester is a colorless water-insoluble oil.

Flies and spider mites are killed completely with 0.01% solutions.

EXAMPLE 10

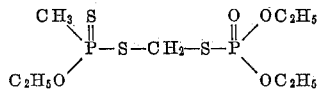

40 grams of diethyl-thiolphosphoric acid ammonium salt are dissolved in 76 ml. of methyl ethyl ketone. 42 grams of methyl-thiono - O-ethyl - S-α-chloromethylphosphonic acid ester (2/10 mol) are added at 60° C. with stirring. Heating is continued at 60° C. for 3 hours and the reaction product taken up in 300 ml. benzene. The benzene solution is washed three times, each time with 50 ml. of water. The benzene solution is separated from the water, dried and fractionated. 26 grams of the new ester are obtained as a colorless water-insoluble oil with B.P. 125° C./0.01 mm. Hg. Yield: 39% of the theoretical.

Aphids and spider mites are killed completely with 0.001% solutions.

EXAMPLE 11

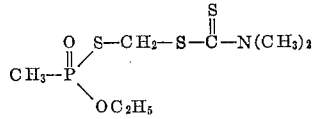

19 grams (1/10 mol) of methyl-phosphonic acid-O-ethyl-S-(α-chloromethyl) ester of the following constitution:

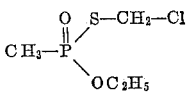

are added dropwise with stirring at 60° C. to 16 grams of dimethyl dithiocarbamic acid sodium salt dissolved in 100 mll. of acetonitrile. Heating is continued for 2 hours to 70° C. and the reaction product is then cooled. The reaction product is added to 500 ml. of ice-water. The separated oil is taken up in 250 ml. benzene. After distilling off the benzene, 14 grams of the new ester remain as a crude product. Yield: 51% of the theoretical.

The ester may be recrystallized from ethyl alcohol. White needles: M.P. 142° C.

EXAMPLE 12

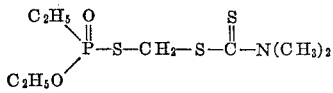

32 grams (2/10 mol) of dimethyl-dithiocarbamic acid sodium salt are dissolved in 150 ml. of acetonitrile. 42 grams (2/10 mol) of ethyl phosphonic acid-O-ethyl-S-α-chloromethyl ester (B.P. 63° C./0.01 mm. Hg) are added with stirring. Heating is continued to 70° C. for 2 hours and then working up as described in Example 11. 48 grams of the new ester are obtained as a yellow water-insoluble oil. Yield: 84% of the theoretical Calculated for mol 287: S, 33.4%; P, 10.8%; N, 4.8%. Found: S, 32.7%; P, 10.8%; N, 4.5%.

Spider mites are killed completely with 0.001% solutions and aphids are killed to 100% with 0.01% solutions.

EXAMPLE 13

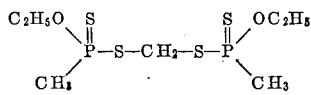

49 grams of the potassium salt of methyl-thiono-thiol-phosphonic acid-O-ethyl ester (0.25 mol) are dissolved in 150 ml. of acetonitrile, whereupon while stirring there are added at 80° C. 22 grams of methylene bromide. The mixture is kept for 1 hour at 80° C. and then cooled at room temperature. 300 ml. of benzene are added and the reaction mixture is poured into 200 ml. of ice-water. The organic layer is washed neutral and dried over sodium sulfate. After distilling off the solvent there are obtained 24 grams of the above shown compound in the form of a slightly yellowish water-insoluble oil. The yield amounts to 59% of the theoretical.

Calculated for mol 324: S, 39.4%; P, 19.1%. Found: S, 39.3%; P, 18.96%.

On rats per os the new ester shows a toxicity of 10 mg./kg. LD$_{50}$. Aphids and spider mites are killed completely with 0.0001% solutions. The compound shows a systemic action against sucking insects and an action against eating insects such as caterpillars.

EXAMPLE 14

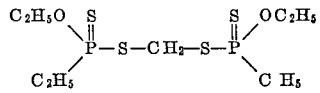

38 grams of the potassium salt of ethyl-thiono-thiol-phosphonic acid-O-ethyl ester are dissolved in 150 ml. of acetonitrile whereupon at 80° C. there are added while stirring 35 grams of methylene bromide. The temperature is kept for 1 further hour at 80° C. and the mixture is worked up as described in the foregoing example. 59 grams of the above shown ester are obtained in the form of a yellowish water-unsoluble oil. The yield amounts to 84% of the theoretical.

Calculated for mol 352: S, 36.4%; P, 17.6%. Found: S, 36.1%; P, 17.3%.

On rats per os the new ester shows a toxicity of 5 mg./kg. LD$_{50}$. Aphids are killed completely with 0.001% solutions. 0.0001% solutions kill spider mites completely.

EXAMPLE 15

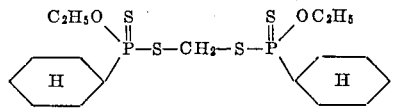

88 grams (2/8 mol) of cyclohexyl-thiono-thiol-phosphonic acid-O-ethyl ester are dissolved in 150 ml. of acetonitrile whereupon there are added at 80° C. 29 grams of methylene bromide. The mixture is kept for 1 further hour at said temperature and then worked up as described in the foregoing examples. 62 grams of the above shown compound, i.e. 81% of the theoretical are obtained in the form of a water-insoluble slightly yellowish colored oil.

Calculated for mol 460: S, 27.8%; P, 13.5%. Found: S, 27.2%; P, 13.2%.

On rats per os the new ester does not show any symptoms even with 1000 mg./kg.

By the same way there may be obtained the corresponding dimethyl- or dipropyl ester of the following formulae

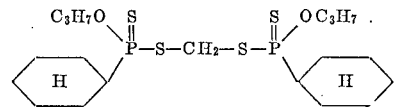

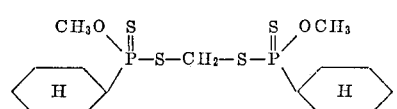

if instead of the potassium salt of cyclohexyl thionothiolphosphonic acid-O-ethyl ester the corresponding O-methyl- or O-propyl ester compounds are used.

EXAMPLE 16

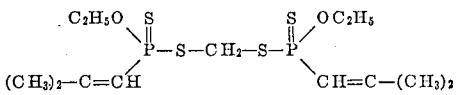

108 grams (0.5 mol) of the potassium salt of iso-butenyl-thionophosphonic acid-O-ethyl ester are dissolved in 200 ml. of acetonitrile whereupon there are added at 80° C. 44 grams of methylene bromide. The reaction mixture is kept for 1 further hour at about 80° C. whereupon the working procedure is carried out as described in the foregoing examples. There are obtained 80 grams of the new ester of the above shown formula as a slightly yellowish colored water-insoluble oil. The yield is 97% of the theoretical. On rats per os the new ester shows a toxicity of 500 mg./kg. LD$_{50}$.

Calculated for mol 404: S, 31.7%; P, 15.4%. Found: S, 31.7%; P, 15.3%.

Spider mites and aphids are killed completely with 0.1% solutions.

EXAMPLE 17

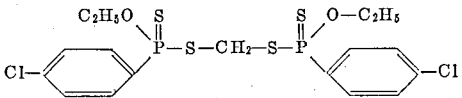

73 grams (¼ mol) of the potassium salt of 4-chloro-phenyl-thionophosphonic acid-O-ethyl ester are dissolved in 150 ml. of acetonitrile. While stirring there are added at 80° C. 22 grams of methylene bromide. While stirring and further heating is continued for 1 hour (at 80° C.) the reaction is completed and the mixture worked up as described in the foregoing examples; 68% of the theoretical of the above shown ester, i.e. 44 grams are obtained as a yellowish colored water-insoluble oil.

Calculated for mol 517: Cl, 13.7%; S, 24.8%; P, 12.0%. Found: Cl, 13.7%; S, 24.8%; P, 12.1%.

On rats per os the new ester does not show any symptoms even with 1000 mg./kg.

What is claimed is:
1. A compound of the formula

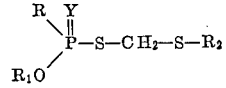

wherein Y is a member selected from the group consisting of oxygen and sulfur; R is a member selected from the group consisting of lower alkyl, cyclohexyl, lower alkenyl, phenyl and chlorophenyl; $R_1$ is straight chain lower alkyl and $R_2$ is a member selected from the group consisting of benzthiazole-(2), benzoxazole-(2), phenyl carbonyl, lower alkyl carbonyl in which the lower alkyl has up to 4 carbon atoms, lower dialkyl amide, lower dialkyl thioamido, cyano, $$-\overset{S}{\underset{\|}{C}}-O-R_4$$

wherein $R_4$ stands for lower alkyl and $$-\overset{X}{\underset{\|}{P}}\diagup\overset{R_5}{\diagdown R_6}$$

in which X is a member selected from the group consisting of oxygen and sulfur and $R_5$ and $R_6$ are members selected from the group consisting of lower alkyl having up to four carbon atoms, straight chain lower alkoxy having up to four carbon atoms, phenyl, chlorophenyl, lower dialkyl amido having up to four carbon atoms in each alkyl group and cyclohexyl.

2. The compound according to claim 1 wherein Y stands for sulfur, R and $R_1$ stand for lower alkyl and $R_2$ stands for lower dialkyl thioamido.

3. The compound according to claim 1 wherein Y stands for sulfur, R and $R_1$ stand for lower alkyl and $R_2$ stands for $$-\overset{S}{\underset{\|}{C}}-O-R_4$$

wherein $R_4$ is lower alkyl.

4. The compound according to claim 1 wherein Y stands for oxygen, R and $R_1$ stand for lower alkyl and $R_2$ stands for lower dialkyl thioamido.

5. The compound according to claim 1 wherein Y stands for sulfur, R and $R_1$ stand for lower alkyl and $R_2$ stands for $$-\overset{X}{\underset{\|}{P}}\diagup\overset{R_5}{\diagdown R_6}$$

wherein X stands for sulfur, $R_5$ stands for lower alkyl and $R_6$ stands for lower alkoxy.

6. The compound of the following formula $$\underset{C_2H_5O}{\overset{C_2H_5}{\diagdown}}\overset{S}{\underset{\|}{P}}-S-CH_2-S-\overset{S}{\underset{\|}{C}}-N(CH_3)_2$$

7. The compound of the following formula $$\underset{C_2H_5O}{\overset{C_2H_5}{\diagdown}}\overset{S}{\underset{\|}{P}}-S-CH_2-S-\overset{S}{\underset{\|}{C}}-OC_2H_5$$

8. The compound of the following formula $$\underset{C_2H_5O}{\overset{CH_3}{\diagdown}}\overset{S}{\underset{\|}{P}}-S-CH_2-S-\overset{S}{\underset{\|}{C}}-N(CH_3)_2$$

9. The compound of the following formula $$\underset{C_2H_5O}{\overset{C_2H_5}{\diagdown}}\overset{O}{\underset{\|}{P}}-S-CH_2-S-\overset{S}{\underset{\|}{C}}-N(CH_3)_2$$

10. The compound of the following formula $$\underset{CH_3}{\overset{C_2H_5O}{\diagdown}}\overset{S}{\underset{\|}{P}}-S-CH_2-S-\overset{S}{\underset{\|}{P}}\diagup\overset{OC_2H_5}{\diagdown CH_3}$$

References Cited by the Examiner

UNITED STATES PATENTS

| | | | |
|---|---|---|---|
| 2,429,178 | 10/1947 | Anish | 260—307.4 |
| 2,450,777 | 10/1948 | Allen et al. | 260—306 |
| 2,862,019 | 11/1958 | Schrader | 260—461 |
| 2,873,228 | 2/1959 | Willard et al. | 260—461 X |
| 2,881,201 | 4/1959 | Schrader | 260—461 |
| 2,885,430 | 5/1959 | Scherer et al. | 260—461 |
| 2,907,787 | 10/1959 | Hoffman et al. | 260—461 |
| 2,908,605 | 10/1959 | Beriger et al. | 260—461 X |
| 3,008,977 | 11/1961 | Schrader | 260—461 |

FOREIGN PATENTS 1,025,200  2/1958  Germany.

OTHER REFERENCES

Kabachnik et al.: "Zhur. Oschei Khim.," vol. 28, pp. 1568–1573 (1958).

CHARLES B. PARKER, *Primary Examiner.*

IRVING MARCUS, MORRIS O. WOLK, JOSEPH P. BRUST, *Examiners.*